(12) United States Patent
Kashimoto et al.

(10) Patent No.: US 7,441,636 B2
(45) Date of Patent: Oct. 28, 2008

(54) BICYCLE DISK BRAKE PAD WITH TITANIUM FIBER FRICTION MATERIAL

(75) Inventors: Yoshikazu Kashimoto, Sakai (JP); Toru Iwai, Kitakatsuragi-gun (JP); Masaaki Hara, Ikoma-gun (JP)

(73) Assignee: Shimano, Inc., Sakai-ku, Sakai, Osaka (JP)

( * ) Notice: Subject to any disclaimer, the term of this patent is extended or adjusted under 35 U.S.C. 154(b) by 244 days.

(21) Appl. No.: 11/279,470

(22) Filed: Apr. 12, 2006

(65) Prior Publication Data

US 2007/0240948 A1    Oct. 18, 2007

(51) Int. Cl.
*F16D 69/00*    (2006.01)
*B32B 7/02*    (2006.01)

(52) U.S. Cl. ............... 188/251 A; 188/251 R; 428/219

(58) Field of Classification Search ......... 188/251 A, 188/251 R, 250 B, 250 G, 218 R, 218 XL; 428/212, 219, 220
See application file for complete search history.

(56) References Cited

U.S. PATENT DOCUMENTS

| 3,650,357 A | * | 3/1972 | Nelson et al. ............... 188/71.5 |
| 4,036,333 A | * | 7/1977 | Mathauser ............... 188/264 A |
| 4,420,067 A | * | 12/1983 | Yamamoto et al. ......... 188/251 A |
| 5,576,358 A | | 11/1996 | Lem et al. |
| 5,891,933 A | | 4/1999 | Kesavan et al. |
| 5,922,452 A | | 7/1999 | Takahashi et al. |
| 5,977,004 A | * | 11/1999 | Higashi et al. ............... 501/135 |

FOREIGN PATENT DOCUMENTS

| JP | 2-26331 A | | 1/1990 |
| JP | 1294553 A | * | 11/1998 |
| JP | 2002-97285 A | | 4/2002 |

OTHER PUBLICATIONS

European search report for EP 07002012.8, the European application that corresponds to this application, dated Nov. 19, 2007.

* cited by examiner

*Primary Examiner*—Melody M Burch
(74) *Attorney, Agent, or Firm*—James A. Deland (57) ABSTRACT

A bicycle brake friction member comprises titanium fibers and a resin.

14 Claims, 7 Drawing Sheets

BICYCLE DISK BRAKE PAD WITH TITANIUM FIBER FRICTION MATERIAL

BACKGROUND OF THE INVENTION

The present invention is directed to bicycles and, more particularly, to a bicycle disk brake pad.

Disk brake pads normally pinch a disk brake rotor that rotates along with the wheel in order to brake the wheel. Resin pads are examples of conventional disk brake pads. Such pads are shown in Japanese Unexamined Patent Application (Kokai) 6-74267, for example. As shown in that reference, resin pads may comprise a backing plate and a friction member attached to the backing plate by an adhesive. The friction member may comprise several powdered elements, sometimes including brass, joined together by a synthetic resin binder. It is also known to form disk brake pads wherein the friction member is formed from sintered materials. For example, a sintered friction member typically used with rotors made from iron, cast iron or stainless steel may comprise a foundation of Cu of Fe powder mixed with Sn, Zn powder, graphite, $MOS_2$, and a hard material such as $SiO_2$ and/or $Al_2O_3$. A sintered friction member typically used with rotors made from titanium or titanium alloy is disclosed in U.S. Pat. No. 5,922,452. That friction member comprises a foundation of titanium or titanium alloy powder, a powder such as Al, Ni, Co, Fe, Mn, Cu, V or Zr for abrasion resistance, a solid lubricant, and a hard material fiber such as mullite. Such a pad improves heat resistance and abrasion resistance relative to sintered pads formed from a foundation of Cu or Fe.

One difficulty with sintered friction members formed from titanium or titanium alloy is that the titanium material is lighter than the other metallic materials, and there is a risk that the titanium does not mix uniformly with the other metallic materials. This can adversely affect braking characteristics and produce variations of braking characteristics from one pad to another, thereby affecting quality control.

SUMMARY OF THE INVENTION

The present invention is directed to various features of a disk brake pad. In one embodiment, a bicycle brake friction member comprises titanium fibers and a resin. Additional inventive features will become apparent from the description below, and such features may be combined with the above features to provide additional benefits.

DETAILED DESCRIPTION OF THE EMBODIMENTS

Figure 1:
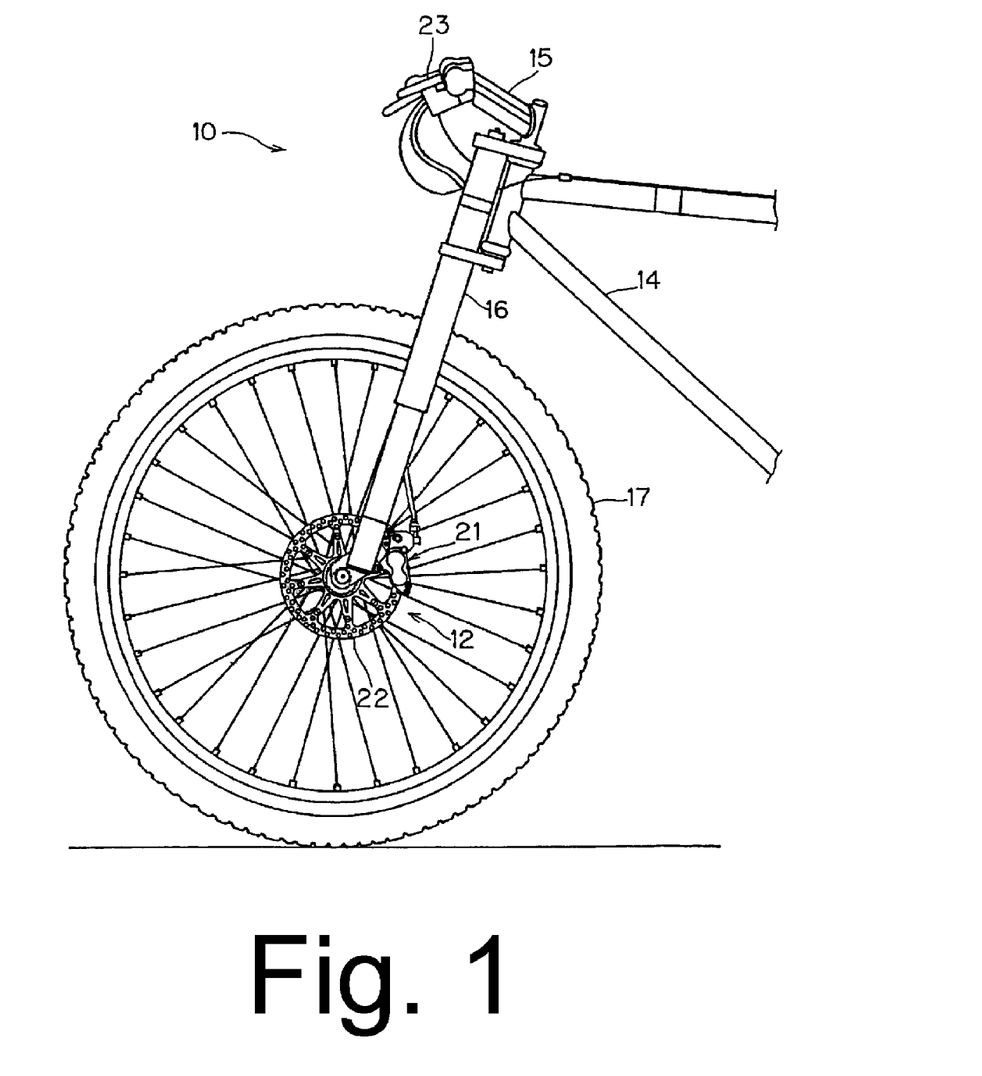
FIG. 1 is a side view of a bicycle with a particular embodiment of a disk brake apparatus.

FIG. 1 is a side view of a bicycle 10 with a particular embodiment of a complete disk brake apparatus 12. Bicycle 10 is a conventional bicycle with a frame 14 supporting a handlebar 15, front and rear forks 16 (only the front fork is shown), front and rear wheels 17 (only the front wheel is shown), and a drive device comprising a sprocket and chain (not shown). Since the structure of such a conventional bicycle is well known in the field, further description if its structure shall be omitted.

Disk brake apparatus 12 comprises a brake caliper 21 mounted on front fork 16, a brake rotor 22 attached to a hub 17a of front wheel 17 so that brake rotor 22 rotates integrally with front wheel 17, and a brake operating mechanism 23. Brake caliper 21 is attached to front fork 16 near brake rotor 22, and it applies a frictional force to brake rotor 22 in response to the operation of brake operating mechanism 23 to stop the rotation of brake rotor 22 and front wheel 17. Brake rotor 22 comprises a centrally disposed hub mounting member 22a attached to hub 17a and a ring-shaped rotor member 22b for contacting brake pads 76.

Figure 2:
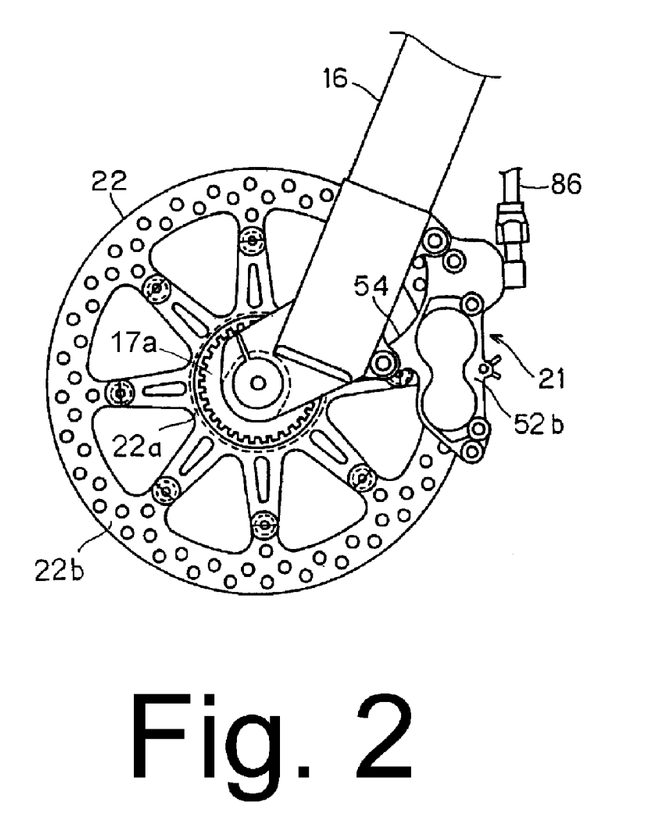
FIG. 2 is a side view of the disk brake apparatus.
Figure 3:
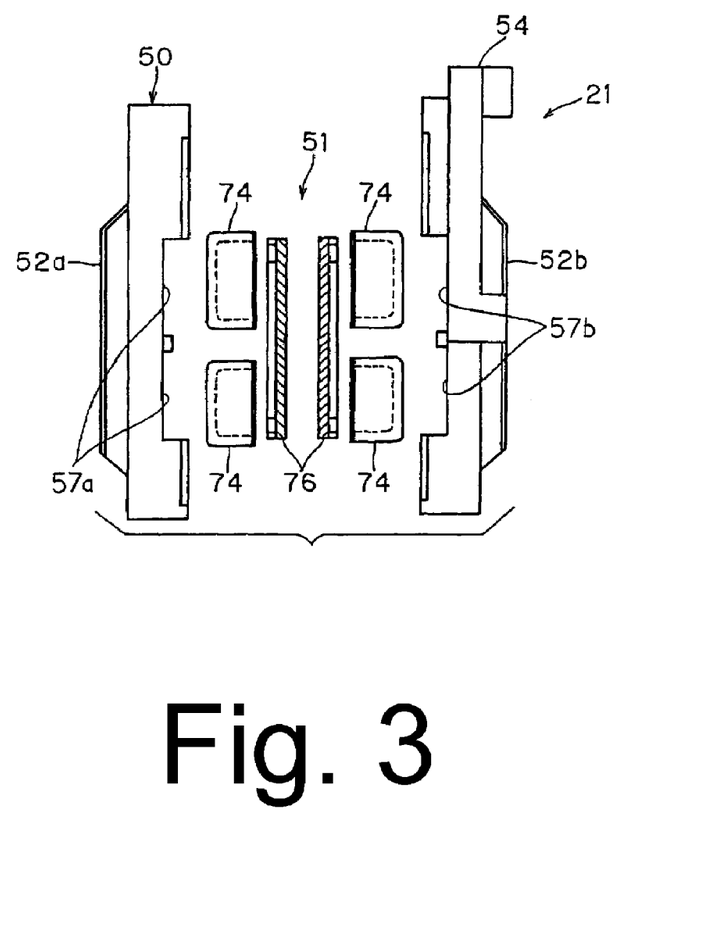
FIG. 3 is an exploded schematic view of the brake caliper assembly.

As shown in FIGS. 2 and 3, brake caliper 21 comprises a housing 50 and a piston unit 51. Housing 50 is constructed of a thermally conducting material such as an aluminum alloy, and it comprises a first housing member 52a and a second housing member 52b bolted together in a conventional manner to form a slot to receive brake rotor 22 therebetween. Housing members 52a and 52b have substantially the same shape, except that hydraulic tubing 86 for brake operating mechanism 23 is connected to second housing member 52b to supply brake oil to both housing members 52a and 52b. Second housing member 52b also has an outwardly extending flange that forms an attachment member 54 for bolting brake caliper 21 to front fork 16.

As shown in FIG. 3, piston unit 51 comprises four pistons 74 and a pair of brake pads 76. Pistons 74 slidably fit into round cylinders 57a and 57b formed in housing members 52a and 52b so as to move between a brake release position and a braking position. Brake pads 76 move integrally with pistons 74. Thus, when pistons 74 move from the brake release position to the braking position, brake pads 76 also move from the brake release position to the braking position. When in the braking position, brake pads 76 press against and apply a frictional force to brake rotor 22 to thereby decrease or stop rotation of brake rotor 22 and front wheel 17. When in the brake release position, the brake pads 76 are spaced apart from brake rotor 22, thus allowing brake rotor 22 and front wheel 17 to freely rotate.

Figure 4:
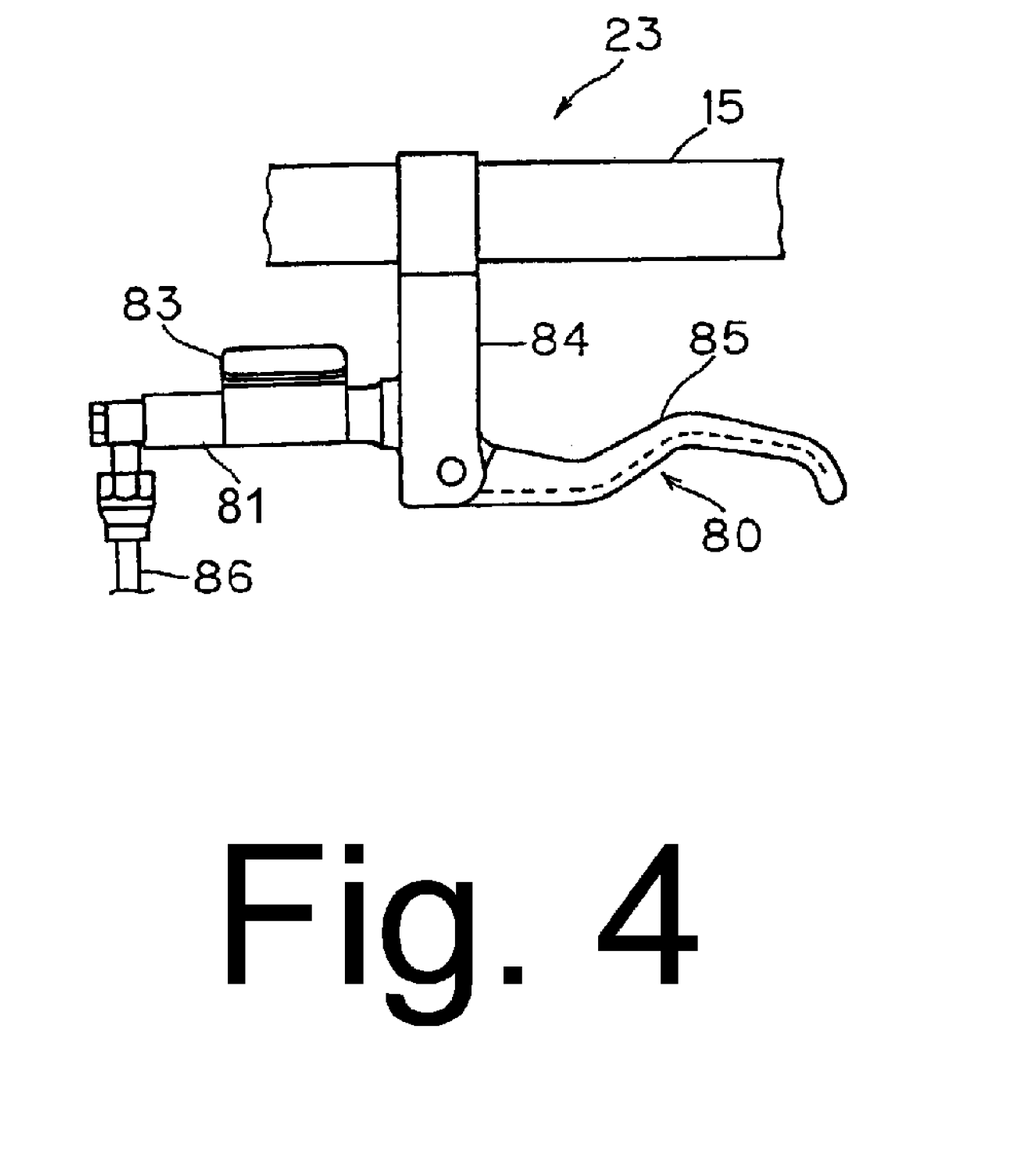
FIG. 4 is a plan view of a particular embodiment of a brake operating device.
Figure 5:
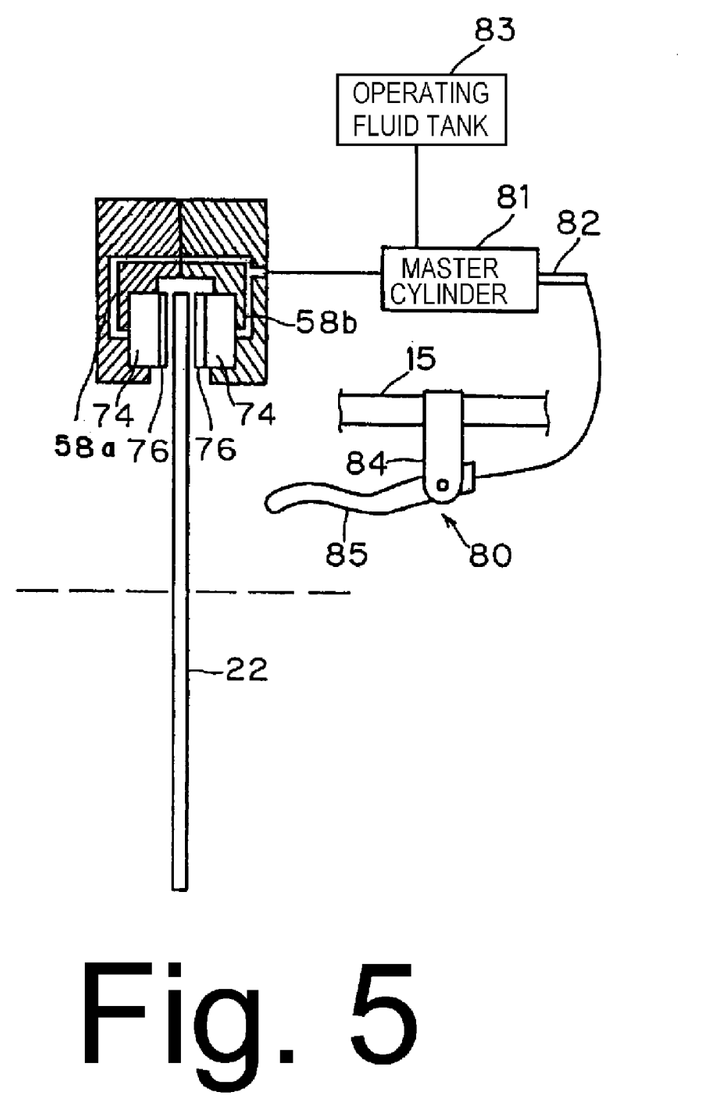
FIG. 5 is a schematic diagram of a particular embodiment of a hydraulic circuit for the disk brake apparatus.

As shown in FIGS. 4 and 5, the brake operating mechanism 23 is attached to handlebar 15. Brake operating mechanism 23 comprises a brake lever assembly 80, a master cylinder 81, a piston 82, and an operating fluid tank 83. Brake lever assembly 80 comprises a bracket 84 mounted on handlebar 15 and a lever component 85 pivotably mounted on bracket 84. Bracket 84 is integrally formed with master cylinder 81, and piston 82 and operating fluid tank 83 are supported by bracket 84. Piston 82 is slidingly disposed within master cylinder 81, and operating fluid tank 83 is in fluid communication with master cylinder 81. One end of piston 82 is connected to lever component 85 so that piston 82 reciprocates inside master cylinder 81 in response to the pulling and releasing of lever component 85. Pulling lever component 85 causes pressurized oil to move through the hydraulic tubing 86 connected to brake caliper 21, the pressurized oil travels through hydraulic passages 58a and 58b and moves pistons 74, brake pads 76 contact and apply frictional force to brake rotor 22, and front wheel 17 is braked.

Figure 6:
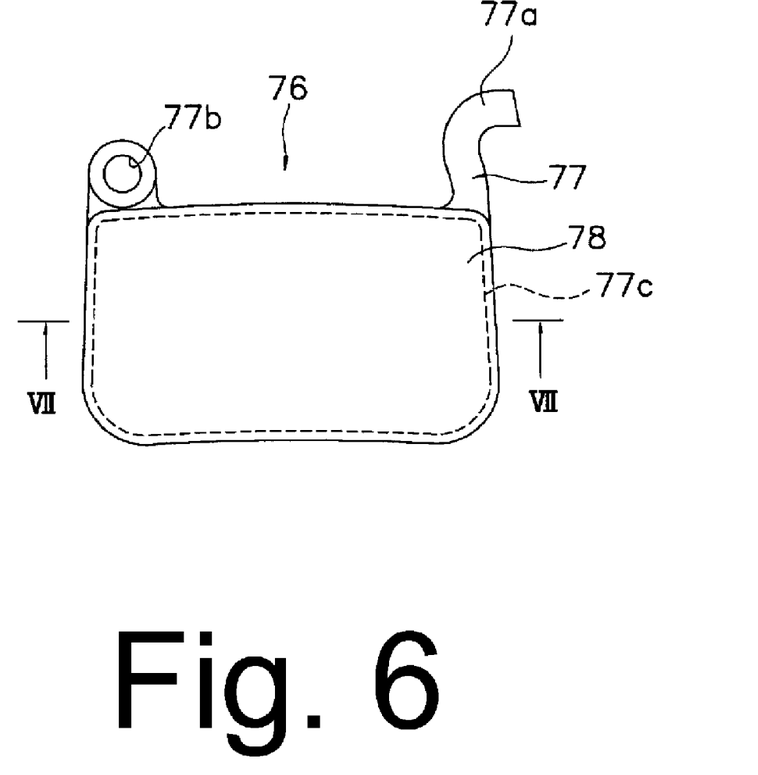
FIG. 6 is a plan view of a particular embodiment of a brake pad.
Figure 7:
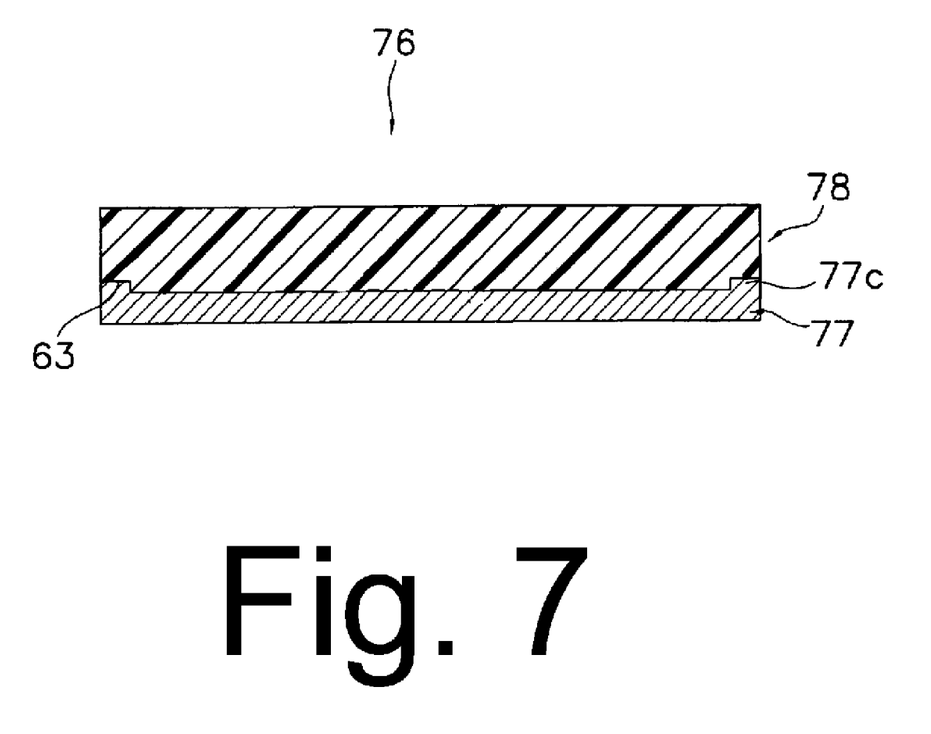
FIG. 7 is a view taken along line VII-VII in FIG. 6.

Brake pads 76 are resin-based pads. As shown in FIGS. 6 and 7, a friction member 78 is mounted (e.g., laminated) to a backing plate 77 by means of an adhesive layer (not shown). Backing plate 77 may comprise a stainless steel sheet having a thickness in the range of from approximately 1.5 mm to approximately 1.8 mm thick. Backing plate 77 includes a hook-shaped detent 77a and a round support 77b, both of which are slidably supported by first and second housing members 52a and 52b. Backing plate 77 also has convex parts 77c in the form on a continuous protrusion that protrudes toward friction member 78 and extends along the periphery of backing plate 77.

Friction member 78 comprises a metal powder such as titanium fibers joined together by a synthetic resin binder. The surface of friction member 78 comes into contact with disk rotor 22 to brake front wheel 17. Friction member 78 may have a thickness in a range of from approximately 2.0 mm to approximately 2.5 mm. Friction member 78 includes notches 63 in the form of a continuous recess that engages convex parts 77c in backing plate 77 to enhance the coupling between friction member 78 and backing plate 77, thereby minimizing the possibility that friction member 78 will shear off of backing plate 77.

In this embodiment, friction member 78 has mixed together the composition shown in Table 1.

TABLE 1

| Ingredient | Specification Example | Wt % | Acceptable |
| --- | --- | --- | --- |
| Titanium Fiber | | 9 | 7-12 |
| Synthetic Resin Binder | | 10 | 5-15 |
| Aramid Fibers | | 5 | |
| Abrasive | Chromium oxide, Silica and Silicon carbide | 16 | |
| Powdered metal | Copper (Brass, Bronze and other copper-like metal) | 15 | |
| Antifriction material | Graphite, Carbon and Sulfured metal | 4 | |
| Friction adjustor | Potassium titanate fiber and Cashew dust | 16 | |
| Infilling | Barium sulphate and Lime | 25 | |

As a result of the combination of titanium fibers and resin, the titanium fibers mix uniformly with the other ingredients, especially when the specific gravities of the titanium fibers and the resin are approximately the same. This makes braking characteristics substantially predictable and uniform from one pad to another. The titanium fibers primarily constitute the fibrous hard phase, rather than mullite in prior art titanium/mullite sintered friction members. The titanium/resin friction member has excellent high-temperature strength, heat resistance, abrasion resistance and coefficient of friction (μ) characteristics, greater than when mullite fibers are used. Abrasion resistance is up to 30% greater than prior art resin pads, particularly those employing brass fibers.

While the above is a description of various embodiments of inventive features, further modifications may be employed without departing from the spirit and scope of the present invention. For example, the length of titanium fibers may be in a range of from approximately 10 μm to approximately 3 mm, the weight percentage of titanium fibers may be in a range of from approximately 7%-9.7% to approximately 15%. The weight percentages of the other components may be varied according to the application.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A bicycle brake friction member comprising:
    titanium fibers, wherein a length of the titanium fibers is in a range of from approximately 10 μm to approximately 3 mm;
    a resin binder;
    aramid fibers;
    an abrasive material;
    a powdered metal other than titanium;
    an antifriction material; and
    a friction adjusting material;
    wherein a fibrous hard phase of the friction member is constituted primarily by the titanium fibers.

2. The friction member according to claim 1 wherein the titanium fibers are mixed substantially uniformly with the other ingredients so that braking characteristics are substantially uniform throughout the friction member.

3. The friction member according to claim 2 wherein a specific gravity of the titanium fibers is approximately the same as a specific gravity of the resin binder.

4. The friction member according to claim 1 wherein the weight percentage of titanium fibers is in a range of from approximately 7% to approximately 15%.

5. The friction member according to claim 4 wherein the weight percentage of resin binder is in a range of from approximately 5% to approximately 15%.

6. The friction member according to claim 5 wherein the combined weight percentage of the abrasive material, the powdered metal, the antifriction material, and the friction adjusting material is approximately 51%.

7. A bicycle brake pad comprising:
    a backing plate; and
    a friction member mounted to the backing plate, wherein the friction member comprises:
        titanium fibers, wherein a length of the titanium fibers is in a range of from approximately 10 μm to approximately 3 mm;
        a resin binder;
        aramid fibers;
        an abrasive material;
        a powdered metal other than titanium;
        an antifriction material; and
        a friction adjusting material;
        wherein a fibrous hard phase of the friction member is constituted primarily by the titanium fibers.

8. The brake pad according to claim 7 wherein the titanium fibers are mixed substantially uniformly with the other ingredients so that braking characteristics are substantially uniform throughout the friction member.

9. The brake pad according to claim 8 wherein a specific gravity of the titanium fibers is approximately the same as a specific gravity of the resin binder.

10. The brake pad according to claim 7 wherein the weight percentage of titanium fibers is in a range of from approximately 7% to approximately 15%.

11. The brake pad according to claim 10 wherein the weight percentage of resin binder is in a range of from approximately 5% to approximately 15%.

12. The brake pad according to claim 11 wherein the combined weight percentage of the abrasive material, the powdered metal, the antifriction material, and the friction adjusting material is approximately 51%.

13. The brake pad according to claim 11 wherein the abrasive material comprises chromium oxide, silica, and silicon carbide; wherein the powdered metal comprises copper; wherein the antifriction material comprises graphite, carbon and sulfured metal; and wherein the friction adjusting material comprises potassium titanate fiber and cashew dust.

14. The brake pad according to claim 13 further comprising an infilling material including barium sulfate and lime.

\* \* \* \* \*